(12) United States Patent
Chen et al.

(10) Patent No.: US 8,246,171 B2
(45) Date of Patent: Aug. 21, 2012

(54) COOLING DEVICE AND PROJECTOR USING THE SAME

(75) Inventors: Chien-Fu Chen, Taipei Hsien (TW); Tsung-Je Chiu, Taipei Hsien (TW); Ching-Te Chu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 318 days.

(21) Appl. No.: 12/730,219

(22) Filed: Mar. 23, 2010

(65) Prior Publication Data
US 2011/0019161 A1     Jan. 27, 2011

(30) Foreign Application Priority Data

Jul. 24, 2009  (CN) .......................... 2009 1 0304821

(51) Int. Cl.
*G03B 21/18* (2006.01)
*G03B 21/26* (2006.01)
*H04N 5/74* (2006.01)
*H01R 33/00* (2006.01)
*F21V 29/00* (2006.01)
*F21V 7/04* (2006.01)
*F28D 1/04* (2006.01)
*F28D 1/02* (2006.01)

(52) U.S. Cl. ............ 353/61; 353/57; 353/119; 348/771; 348/748; 362/646; 362/294; 362/555; 165/151; 165/153

(58) Field of Classification Search .................... 353/61, 353/52, 57, 119; 348/771, 748; 362/646, 362/294, 555; 165/151–153
See application file for complete search history.

(56) References Cited

U.S. PATENT DOCUMENTS

| | | | |
|---|---|---|---|
| 7,841,721 B2 * | 11/2010 | Momose et al. | 353/54 |
| 2007/0211477 A1 * | 9/2007 | Kim | 362/373 |
| 2010/0053567 A1 * | 3/2010 | Lian et al. | 353/61 |

FOREIGN PATENT DOCUMENTS

CN                10620368 A1      7/2008

* cited by examiner

*Primary Examiner* — Georgia Y Epps
*Assistant Examiner* — Magda Cruz
(74) *Attorney, Agent, or Firm* — Altis Law Group, Inc.

(57) ABSTRACT

A cooling device for projector includes a shell, a circuit board, a light machine, a first fins, a fan assembly and a heat dissipation module. The light machine is mounted on the circuit board, and includes a light source having a red LED, a green LED facing the red LED, and a blue LED positioned between both of them. The first fins are mounted on the light source adjacent to the blue LED. The fan assembly includes a fan having a fan shell with an inlet and an outlet, and a second fins connected to the light source to aligned with the red LED. The heat dissipation module includes a third fins mounted on the light source to align to the green LED, a fourth fins mounted on the fan shell to align to the outlet of the fan, and a heat pipe interconnecting the third and fourth fins.

14 Claims, 2 Drawing Sheets

COOLING DEVICE AND PROJECTOR USING THE SAME

BACKGROUND

1. Technical Field

The disclosure relates to an image display device, and particularly to a cooling device for a projector and a projector using the cooling device.

2. Description of Related Art

Typically, a light source in a projector includes red, green, and blue light emitting diodes (LEDs). The power consumed by the red and green LEDs is significantly greater than that consumed by the blue LEDs, therefore more heat is generated by the red and green LEDs. However, the red, green, and blue LEDs are typically cooled by similar cooling devices powered equally, as a result, the red, green LEDs may not be effectively cooled, and the blue LEDs may be over-cooled. Therefore, the traditional heat dissipation of the light source is unbalanced and ineffective.

What is needed is to provide a cooling device for a projector wherein the problems above mentioned can be overcome.

DETAILED DESCRIPTION

Figure 1:
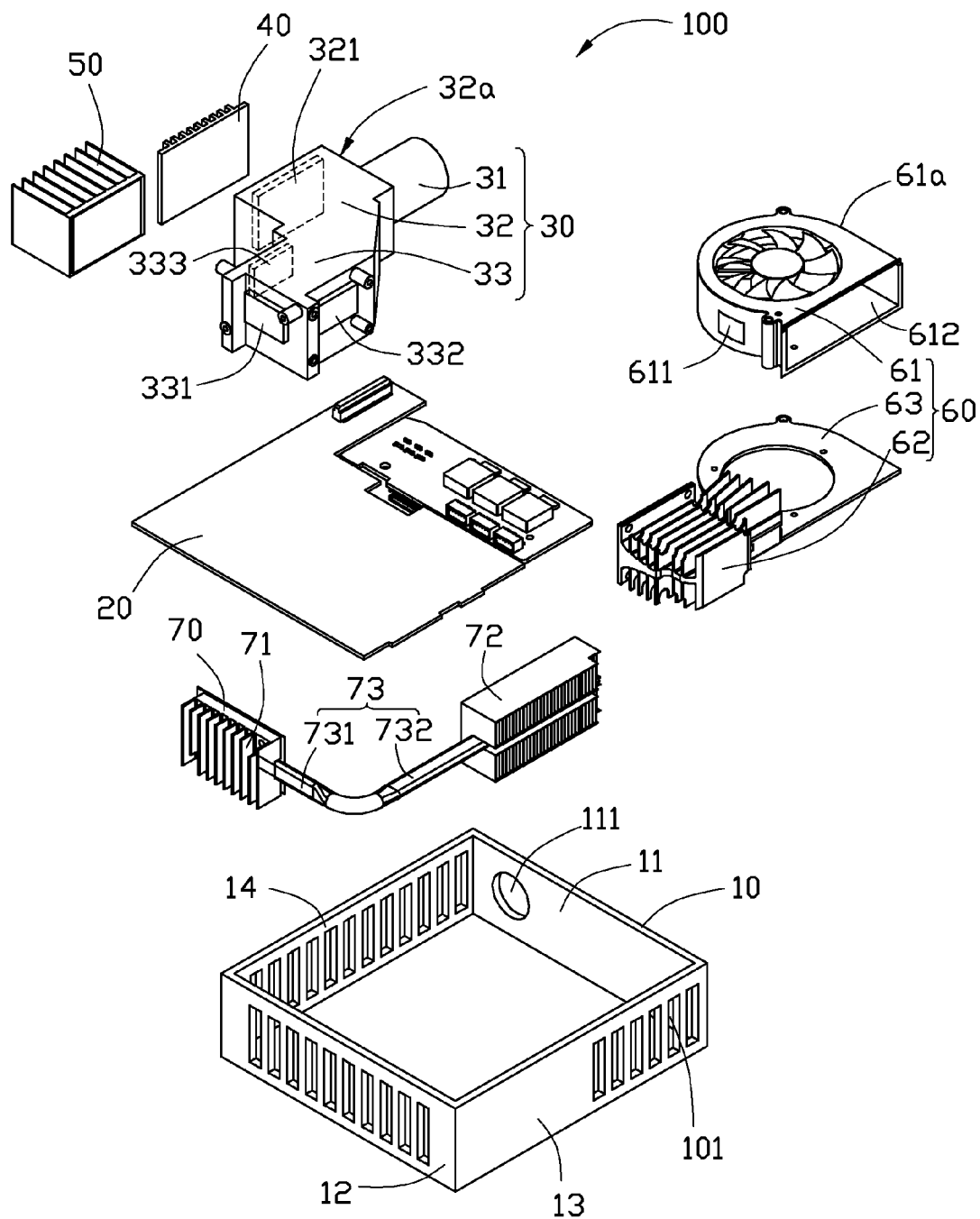
FIG. 1 is an isometric, exploded view of a cooling device for a projector according to an exemplary embodiment.
Figure 2:
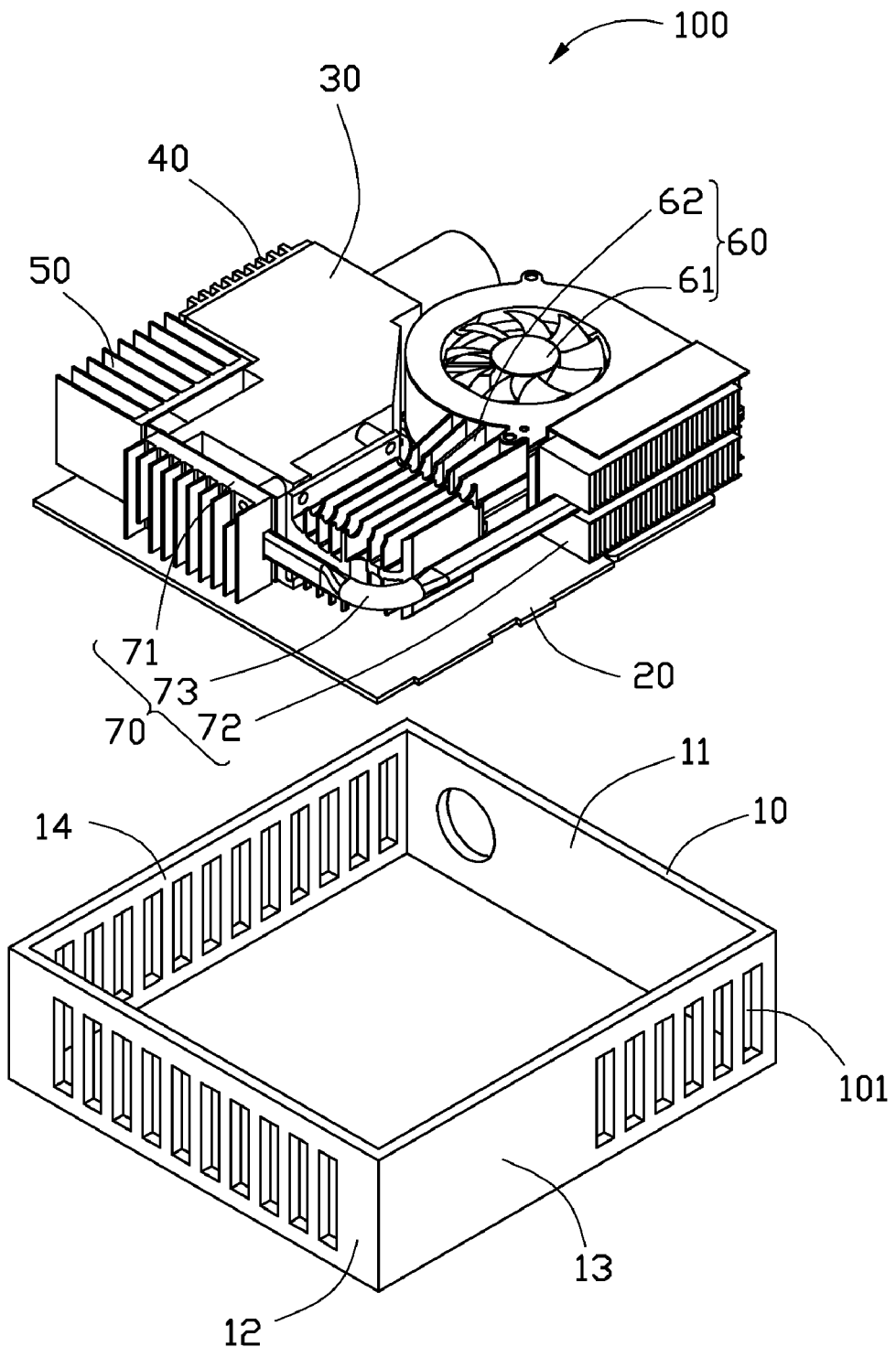
FIG. 2 is a partially assembled, isometric view of the cooling device for a projector of FIG. 1

Referring to FIG. 1 and FIG. 2, a cooling device for a projector 100 according to an exemplary embodiment of the present disclosure is shown. The projector 100 includes a shell 10 accommodating a circuit board 20, a light machine 30, a DMD heat sink 40, a first fins 50, a fan assembly 60, and a heat dissipation module 70. The DMD heat sink 40, the first fins 50, the fan assembly 60, and the heat dissipation module 70 constitute the cooling device.

The shell 10 includes a first sidewall 11, a second sidewall 12 parallel and opposite to the first sidewall 11, a third sidewall 13 and fourth sidewall 14 parallel and opposite to the sidewall 13. The first sidewall 11 defines a projection hole 111 therein. A number of vents 101 are respectively formed in the second, third, and fourth sidewalls 12, 13, and 14 of the shell 10. The vents 101 are used for discharging the heat dissipated by the cooling device out of the shell 10.

The circuit board 20 is installed inside the shell 10 for controlling the operation of the light machine 30 and the fan assembly 60.

The light machine 30 is mounted on the circuit board 20. The light machine 30 includes a lens 31, a light modulating device 32 and a light source 33. The light source 33 and the lens 31 are respectively situated on opposite ends of the light modulating device 32. The lens 31 is aligned with the projection hole 111 of the first sidewall 11 for projection of light. The light modulating device 32 includes a housing 32a and a digital micro mirror 32 (DMD 32) that is mounted inside of the housing 32a, facing the third sidewall 13. The light source 33 includes a green LED 331, a red LED 332 and a blue LED 333. The red LED 332 faces the blue LED 333 and the fourth sidewall 14 of the shell 10 behind the blue LED 333. The green LED 331 is located between the red LED 332 and the blue LED 333, facing the first sidewall 11 of the shell 10.

The DMD heat sink 40 is mounted on the outside of the housing 32a of the light modulating device 32, adjacent to the DMD 321 for dissipating the heat generated by the DMD 321. The DMD heat sink 40 is also adjacent to the fourth sidewall 14 of the shell 10.

The first fins 50 are mounted on the light source 33 adjacent to the blue LED 333 for cooling the blue Led 333 by conducting the heat of the blue LED 333 to outside via the vents 101 on the fourth sidewall 14 of the shell 10.

The fan assembly 60 is mounted on the circuit board 20. The fan assembly 60 includes a fan 61, second fins 62, and a connecting member 63 interconnecting the fan 61 and the second fins 62. The connecting member 63 has a shape similar to the fan 61 in profile. The fan 61 is supported on a surface of the connecting members 63. The second fins 62 are fixedly mounted to an end of the connecting member 63 by one side thereof and mounted to the light source 33 by an opposite side thereof to align to the red LED 332 and adjacent to the second sidewall 12 of the shell 10. The fan 61 is an axial fan having an approximately round fan shell 61a. The fan 61 defines an inlet 611 and an outlet 612 in the fan shell 61a. The inlet 611 is aligned with the second fins 62. The fan 61 is adjacent to the lens 31 and the outlet 612 faces the third sidewall 13.

The heat dissipation module 70 includes third fins 71, fourth fins 72, and a heat pipe 73 interconnecting the third and fourth groups of fins 71, 72. The third fins 71 are mounted to the light source 33 for being aligned with the green LED 331 and adjacent to the second wall 12 of the shell 10. The fourth fins 72 are mounted to the fan shell 61a of the fan 61 and aligned with the outlet 612 and adjacent to the third sidewall 13 of the shell 10. The heat pipe 73 includes an evaporator section 731 heat-conductively connected to the third fins 71, and a condenser section 732 heat-conductively connected to the four group of fins 72.

In use, the DMD 321, the green LED 331, the red LED 332, and the blue LED 333 generate large amounts of heat. The green LED 331 and the red LED 332 typically generate more heat than the blue LED 333 does. The DMD 321 is effectively cooled by the DMD heat sink 40. The blue LED 333 is cooled by the first fins 50. The heat generated by the red LED 332 is transmitted to the second fins 62. The heat generated by the green LED 331 is transmitted to the third fins 71, which further transmit the heat to the fourth fins 72 via the heat pipe 73. The fan 61 accelerates the ambient airflow around the DMD heat-sink 40, the first fins 50, the second fins 60, and the fourth fins 72, and improves the heat dissipation of those cooling elements via the vents 101.

In the present embodiment, the second fins 62 and the third fins 71 are respectively mounted adjacent to the red LED 332 and the green LED 331 for directly dissipating the heat generated by the red LED 332 and green LED 331, furthermore, the heat pipe 73 and the fourth fins 72 are employed to enhance heat dissipation thereby providing further cooling of the red LED 332 and green LED 331.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A projector comprising:
   a shell;
   a circuit board installed inside the shell;
   a light machine mounted on the circuit board; the light machine comprising a light source which comprises a red LED, a green LED facing the red LED, and a blue LED positioned between the red LED and the green LED;

a first fins mounted on the light source of the light machine adjacent to the blue LED;

a fan assembly comprising a fan comprising a fan shell with an inlet and an outlet, and a second fins connected to the fan by one side thereof and mounted to the light source by another side thereof to align to the red LED; and a heat dissipation module comprising a third fins, a fourth fins, and a heat pipe interconnecting the third and fourth fins; the third fins mounted on the light source to align to the green LED; and the fourth groups of fins mounted on the fan shell aligned with the outlet of the fan.

2. The projector of claim 1, wherein the heat pipe of the heat dissipation module comprises an evaporator section heat-conductively connected to the third fins, and a condenser section heat-conductively connected to the fourth fins.

3. The projector of claim 1, wherein the second fins of the fan assembly is aligned to the inlet of the fan.

4. The projector of claim 1, wherein the light machine further comprises a lens and a light modulating device; the light source and the lens respectively situated on opposite ends of the light modulating device.

5. The projector of claim 4, wherein the light modulating device comprises a housing and a digital micro mirror mounted inside the housing.

6. The projector of claim 5, further comprises a DMD heat sink mounted on the outside of housing of the light modulating device adjacent to the digital micro mirror.

7. The projector of claim 4, wherein the fan assembly is mounted on the circuit board; the fan is adjacent to the lens and the outlet of the fan faces towards the outside of the shell.

8. The projector of claim 1, wherein the shell comprises a first sidewall, a second sidewall opposite to the first sidewall, a third sidewall and fourth sidewall; the third sidewall and the fourth sidewall interconnect the first and second sidewalls; the red LED faces the blue LED and the fourth sidewall of the shell is behind the blue LED 333.

9. The projector of claim 8, wherein the first sidewall of the shell defines a projection hole therein; and a plurality of ventilation window are respectively formed on the second, third, and fourth sidewalls of the shell.

10. The projector of claim 1, wherein the fan further comprises a connecting member interconnecting the fan and the second fins; the connecting members is shaped similar to the fan in profile and supports the fan on an surface of the connecting members.

11. A cooling device for a projector that comprises:

a shell;

a circuit board installed inside the shell; and a light machine mounted on the circuit board; the light machine comprising a light source which comprises a red LED, a green LED facing the red LED, and a blue LED positioned between the red LED and the green LED, the cooling device comprising:

a first fins mounted on the light source of the light machine adjacent to the blue LED;

a fan assembly comprising a fan comprising a fan shell with an inlet and an outlet, and a second fins connected to the fan by one side thereof and mounted to the light source by another side thereof to align to the red LED; and a heat dissipation module comprising a third fins, a fourth fins, and a heat pipe interconnecting the third and fourth fins; the third fins mounted on the light source to align to the green LED; and the fourth groups of fins mounted on the fan shell aligned with the outlet of the fan.

12. The cooling device of claim 11, wherein the heat pipe of the heat dissipation module comprises an evaporator section heat-conductively connected to the third fins, and a condenser section heat-conductively connected to the fourth fins.

13. The cooling device of claim 11, wherein the second fins of the fan assembly is aligned to the inlet of the fan.

14. The cooling device of claim 11, wherein the fan assembly is mounted on the circuit board; the fan is adjacent to the lens and the outlet of the fan faces towards the outside of the shell.

* * * * *